United States Patent [19]
Porter

[11] Patent Number: 5,662,053
[45] Date of Patent: Sep. 2, 1997

[54] GUIDE ADAPTED TO FIT ON AN ELECTRO-MECHANICAL DEVICE FOR PLANTING SEEDS

[76] Inventor: Wilson Porter, 119 Sunnyside Dr., Centralia, Wash. 98531

[21] Appl. No.: 582,118

[22] Filed: Jan. 2, 1996

[51] Int. Cl.$^6$ .................................................. A01C 11/00
[52] U.S. Cl. .............................. 111/200; 111/75; 111/106
[58] Field of Search ............................... 7/114, 165, 170; 111/104, 105, 106, 200, 75; 141/18, 331, 340, 341, 364; 221/199, 197, 287, 200, 202; 222/196, 460

[56] References Cited

U.S. PATENT DOCUMENTS

| | | | |
|---|---|---|---|
| 450,946 | 4/1891 | McKay | 111/106 |
| 2,609,123 | 9/1952 | Goldsby et al. | 111/75 X |
| 3,160,328 | 12/1964 | Rutherford | 111/75 X |
| 3,765,347 | 10/1973 | Tormstrom | 111/106 X |
| 3,797,417 | 3/1974 | Hahn | 111/106 X |
| 5,078,189 | 1/1992 | Ronsonet | 141/331 X |
| 5,080,259 | 1/1992 | Hadley | 141/364 X |
| 5,121,779 | 6/1992 | Green | 141/331 X |

*Primary Examiner*—Terry Lee Melius
*Assistant Examiner*—Robert Pezzuto
*Attorney, Agent, or Firm*—Thomas W. Secrest

[57] ABSTRACT

Many people like to plant a garden. The earth is prepared for receiving the seeds. A person can dispense the seeds into the earth. An even distribution of the seeds is difficult. The subject invention comprises a guide for holding seeds. One end of the guide is an open funnel for directing the flow of the seeds to the earth. The guide is attached to an electro-mechanical device which vibrates. The vibration causes the seeds to flow through the open funnel. A person utilizing the guide and the electro-mechanical device can control the rate of flow of seeds to the earth. The result is a more even distribution of the seeds in the garden than previously realized by dispensing the seeds by hand. The electro-mechanical device can be an electric screw driver having a housing, an electric motor and batteries. There are many different electric screw drivers commercially available.

14 Claims, 12 Drawing Sheets

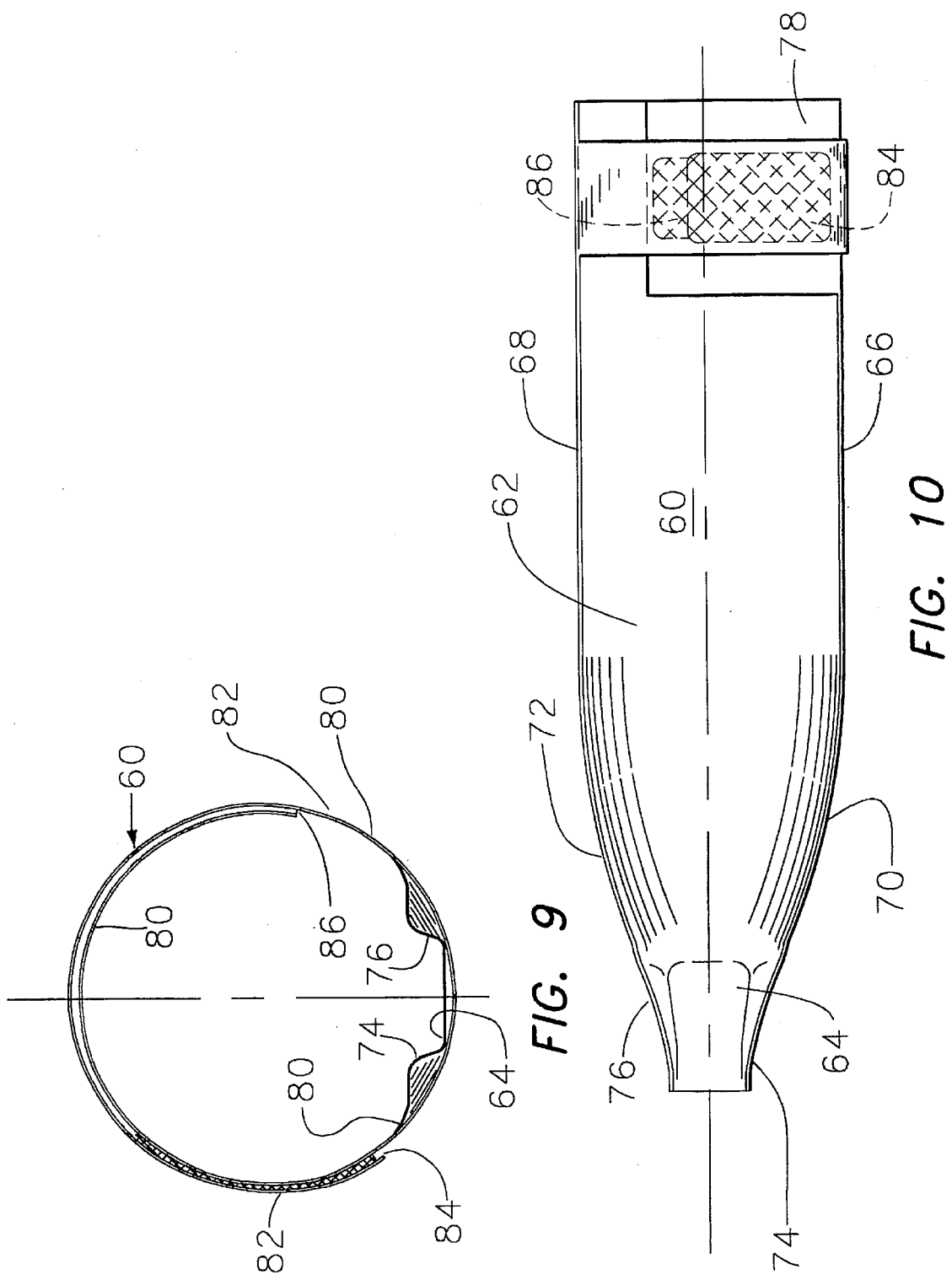

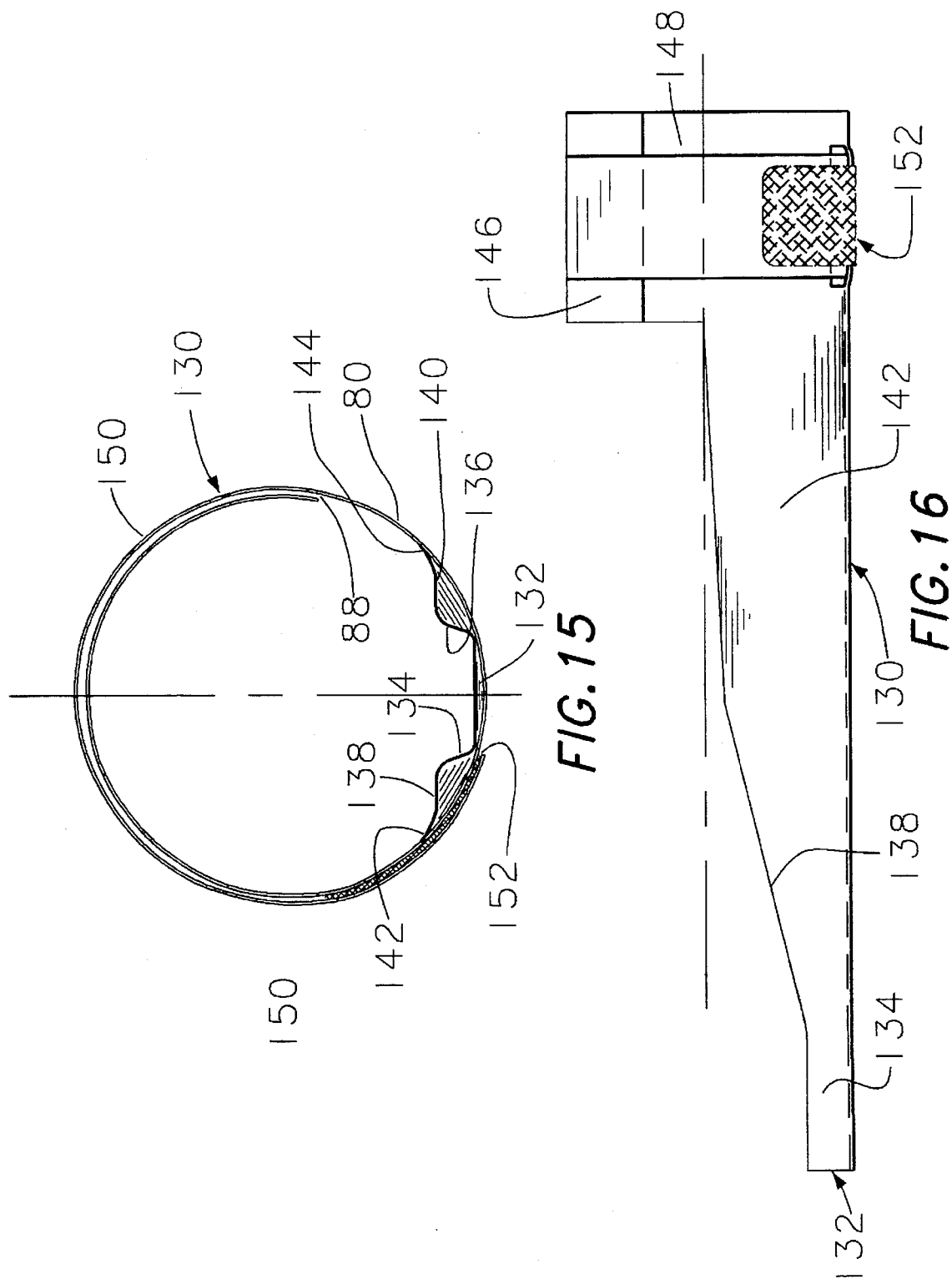

GUIDE ADAPTED TO FIT ON AN ELECTRO-MECHANICAL DEVICE FOR PLANTING SEEDS

CROSS-REFERENCES TO RELATED PATENT APPLICATIONS (if any)

There is no related application.

STATEMENT AS TO RIGHTS TO INVENTIONS MADE UNDER FEDERALLY SPONSORED RESEARCH AND DEVELOPMENT (if any)

This invention was developed with private funds and did not receive any funds related to federally sponsored research and development.

BACKGROUND OF THE INVENTION

1. Field of the Invention

This invention is relating to the planting of seeds in a garden. Many people enjoy working in a garden. These people enjoy tilling the soil and planting the seeds and watching the plants grow.

At times, the planting of seeds is a tedious process and it is difficult to realize an even distribution of the seeds. There are hand-held devices for planting seeds. Again, a problem is the even distribution of the seeds from these hand-held devices. These hand-held devices can be difficult to use in regard to an even distribution of the seeds.

2. Description of the Prior Art

Prior to initiating the preparation to this patent application, a patent search was made.

The interesting patents of this patent search are identified as follows by "Name" and "Patent Number."

| NAME | PATENT NUMBER |
| --- | --- |
| J. A. Fraim | Des. 161,913 |
| J. S. Madderra | 1,830,283 |
| V. Mahurin | 2,171,037 |
| Atkinson | 4,011,612 |
| Wendt | 4,046,285 |
| Weaver | 4,183,469 |
| Walsh | 4,206,714 |
| Stein | 4,809,880. |

The applicant considers that none of these patents teach what the applicant is disclosing in this patent application and claiming in this patent application.

Fraim shows a seed tray for showing the size of the seeds and also for dispensing the seeds into the earth.

Madderra teaches of a hand-held device for pushing seeds out one end for planting into the earth.

Mahurin shows a planter device which comprises a funnel and a cup for retaining seeds. The end of the tunnel can be stuck into the earth and seeds poured into the upper end of the funnel.

Atkinson has a device which forms a furrow in the earth for receiving seeds and which device also allows the seeds to be planted into the furrow.

Wendt teaches of a device for filling cups or containers with seeds. Wendt is interesting but does not anticipate the applicant's invention.

Weaver shows a device for planting seeds. There is a battery for vibrating the seeds so that the seeds can be discharged into the earth.

Walsh teaches of a valve device and means for actuating the valve device. There are two tubes with one tube inside of the other. The valve is opened, manually, to allow seeds to fall through and be planted in the earth.

Stein shows a device for measuring seeds and the like. Stein does not anticipate the applicant's invention.

In addition to the planting of seeds according to the above-identified patents, there is also the planting of seeds by a person holding seeds in the hand and dropping these seeds into the groove in the earth or onto the earth with the hope that the seeds will sprout and grow.

SUMMARY OF THE INVENTION

The invention is a guide adapted to be positioned on an electro-mechanical device such as a battery-powered screw driver. The guide holds a number of seeds and directs the movement of the seeds. A person may hold the electro-mechanical device with the guide and direct the movement of the seeds to the desired location and also control the number of seeds dropped onto the earth.

The electro-mechanical device, i.e., a battery operated screwdriver, vibrates. With the vibration, the guide moves and the seeds move on the guide and can be directed to fall off of the guide and can be directed to a desired location in the garden and on the earth.

The person holding the electro-mechanical device with the guide can tilt the guide to a desired position so as to assist in controlling the flow of the seeds on the guide and onto the earth. By controlling the flow of seeds, there is controlled the planting of the seeds to the earth.

OBJECTS AND ADVANTAGES

Some of the objects and advantages of this invention are that there is provided a guide adapted to fit onto an existing piece of commercially available equipment for directing the flow of seeds to the earth in a garden;

A guide adapted to fit onto an existing piece of equipment for controlling the flow of seeds to a garden;

A guide which makes it easier to plant seeds in a garden and especially so for a person with disabled hands such as an older person with arthritis; and, A guide which makes it possible to plant seeds in a garden in less time than with previously used devices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

In the drawings, it is seen that

FIG. 9 is an inner end, i.e., that end which fits onto the electro-mechanical device, of the second species of the guide and which guide uses as a first part of a fastening device a loop and as a second part of said fastening device a hook;

FIG. 10 is a top plan view of the second guide of FIGS. 8 and 9;

FIG. 15 is an inside end view, i.e. that end which is positioned on an electro-mechanical device, of said fourth guide using a strip of adhesive material for adjusting the opening of the inside end; and, FIG. 16 is a side-elevational view of the guide of FIGS. 14 and 15 and illustrates the strip of adhesive material.

DESCRIPTION OF THE PREFERRED EMBODIMENT(S)

Figure 1:
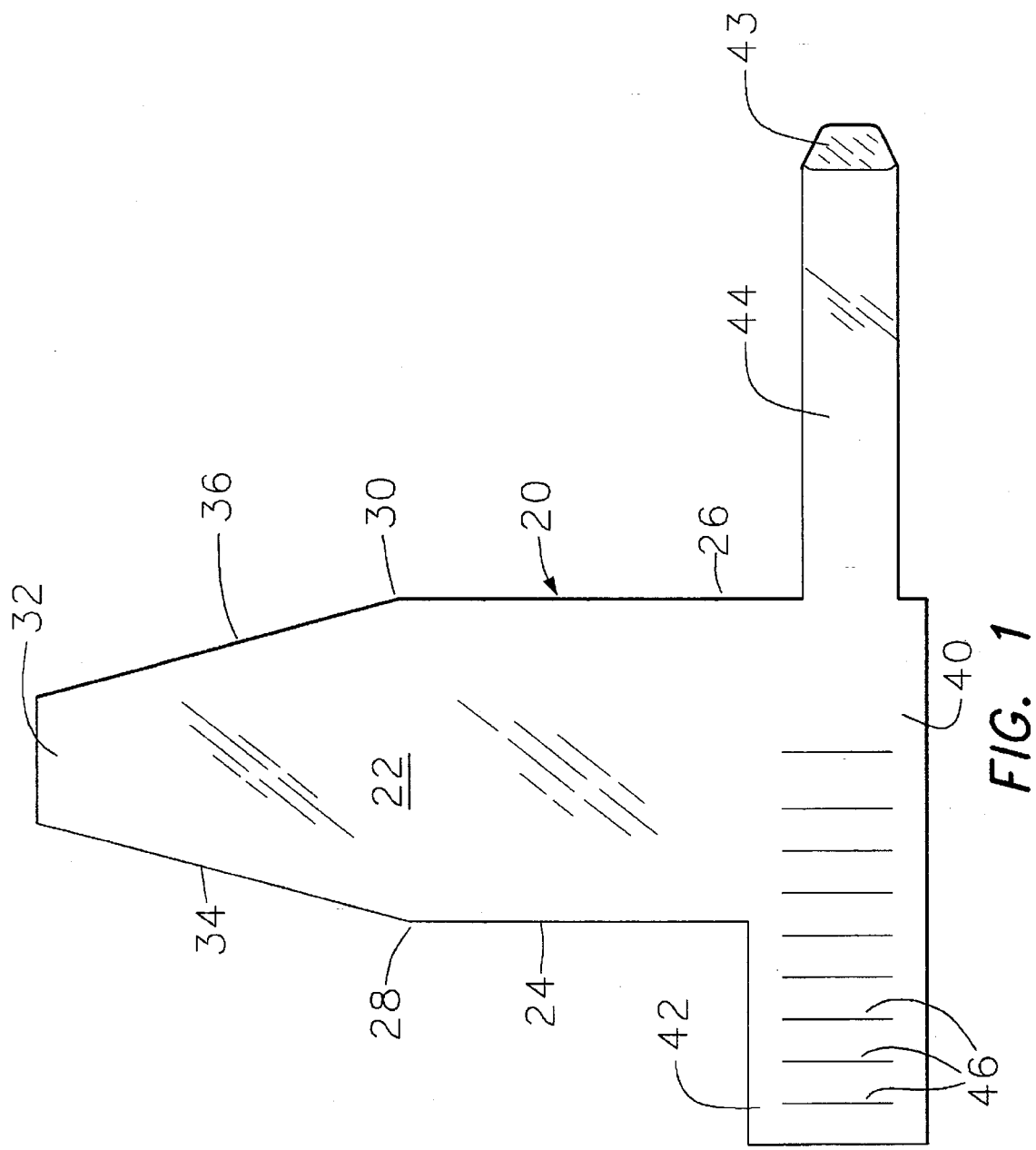
FIG. 1 is a top plan view of a first guide or first species in a stretched-out or expanded configuration.
Figure 2:
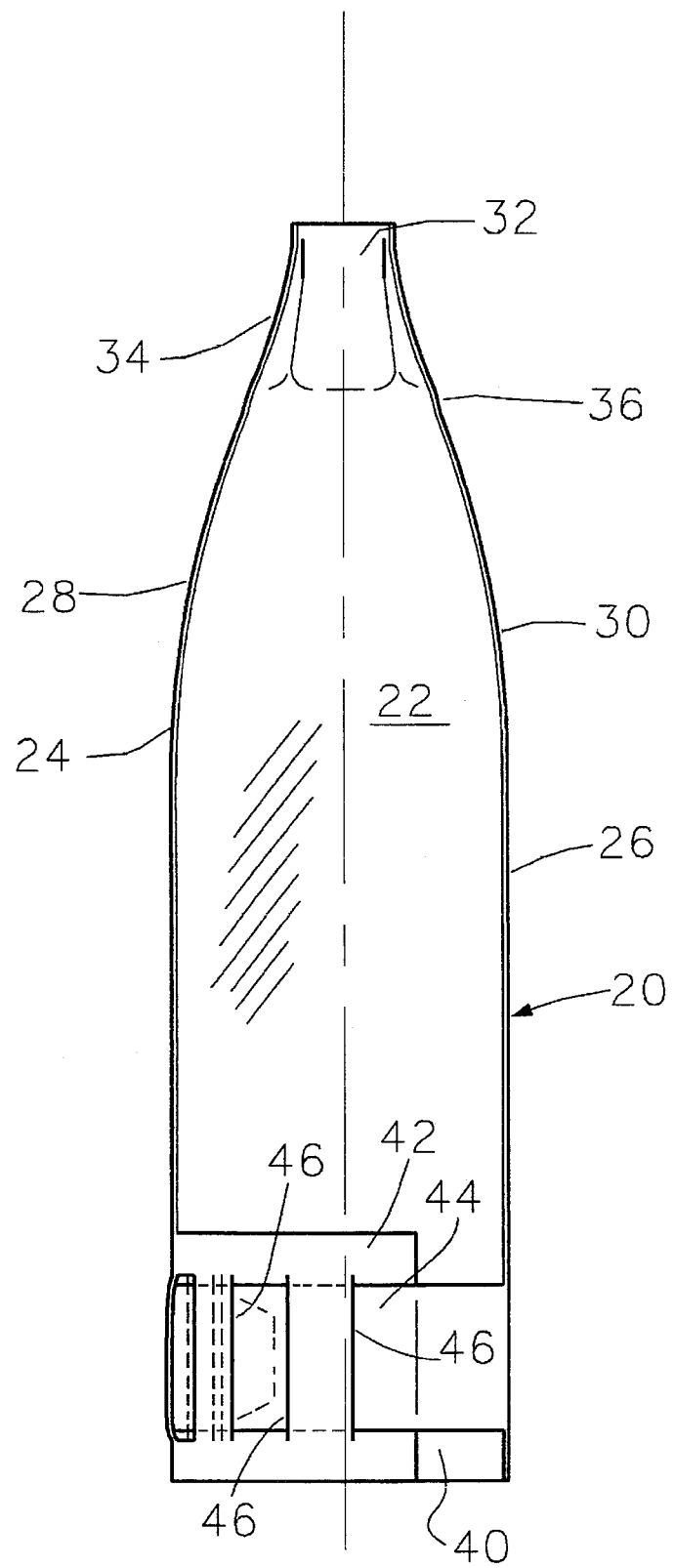
FIG. 2 is a top plan view of a guide in a funnel-shaped configuration and ready for application to the electro-mechanical device and also ready for receiving seeds.

With reference to FIGS. 1–6 of the drawings and, especially, to FIG. 1 it is seen that there is provided a guide 20 having an elongated base 22. Along the left of the elongated base 22, there is left side 24, and along the right of base 22 there is a right side 26.

The left side 24 at its outer end tapers into an elevated left taper 28.

The right side 26 on its outer end tapers into an elevated right taper 30.

It is to be understood that the left side 24 and the right side 26 are elevated to form a guide or a funnel-like configuration. Similarly, the left taper 28 and the right taper 30 are elevated.

There is an (outer funnel end 32) or (a restricted flow end 32). At the funnel end 32 the base 22 is elevated at 33 to function as a dam or restrictor to the flow of comminuted material such as seeds.

On the left of the (outer funnel end 32), there is a side 34 which is elevated. On the right of the outer funnel end 32, there is side 36 which is elevated.

Again, the left side 24, the right side 26, the left taper 28, the eight taper 30, the left side 34 and the right side 36 in conjunction with the elongated base 22 act as a guide and funnel for the flow of seeds to the outer funnel end 32.

At the upper end or the inner end, i.e., that end which is positioned on the electro-mechanical device, of the guide 20, there is an inner central part 40. The inner central part 40 spreads into a left flap 42 and into a right flap 44.

On the left flap 42, there is a series of separations or cuts 46.

There are at least nine battery powered electro-mechanical devices, i.e., screwdrivers, suitable for use with the guide 20. The diameter of the electro-mechanical device for receiving the guide 20 varies from device to device. Therefore, to have a guide 20 which will fit onto all of the electro-mechanical devices it is necessary to have an adjustable means. This adjustable means comprises the central part 40, the left flap 42 with separations 46 and the right flap 44. The width of the right flap 44 is less than the length of the separations 46 so that the right flap 44 can be moved in the separations 46. The right flap 44 can be positioned in the separations 46 and the guide 20 placed on the electro-mechanical device. The position of the right flap 44 in the separations 46 of the left flap 42 can be determined and adjusted for snugly fitting the guide on the electro-mechanical device. The outer end of right flap 44 is raised at 43 or is thicker than the main part of flap 44 to assist in definitely positioning flap 44 in serrations 46.

Figure 3:
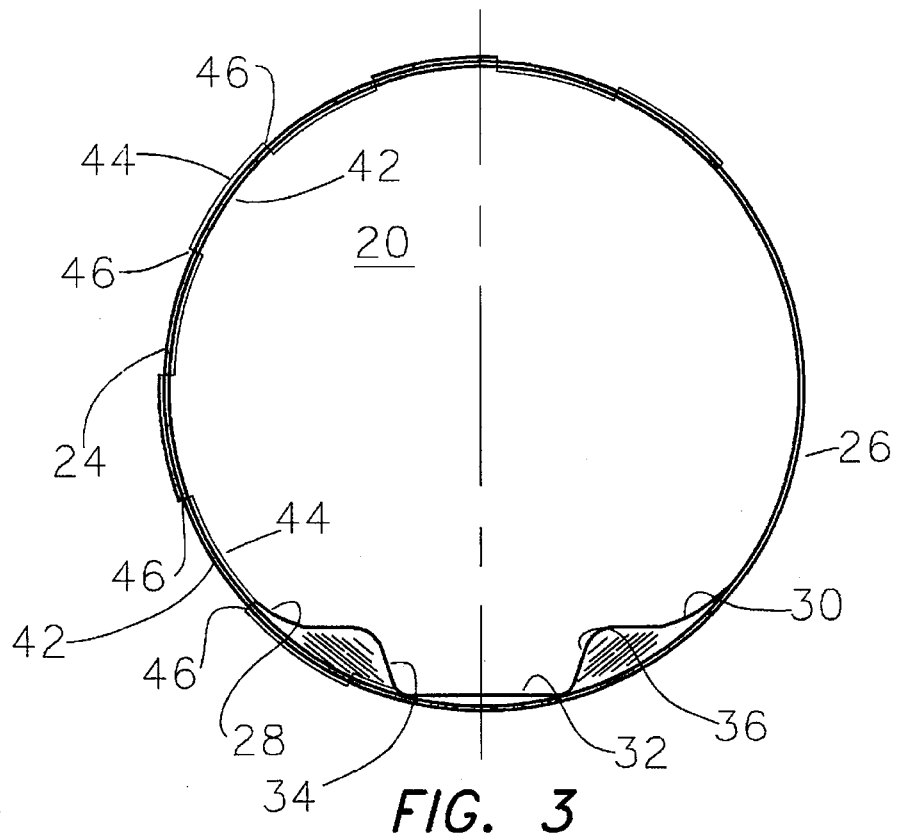
FIG. 3 is an inside end elevational view of the guide and which end fits onto the electro-mechanical device.
Figure 5:
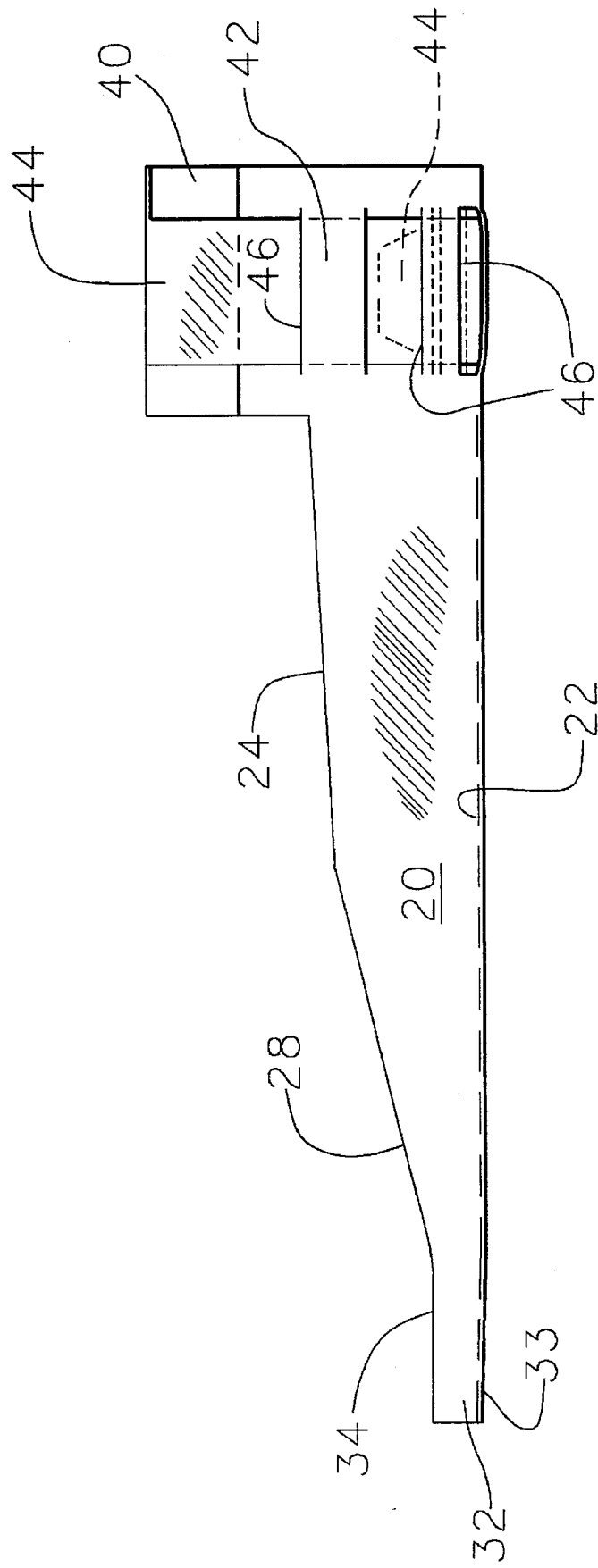
FIG. 5 is a side-elevational view of the guide with the understanding that the other side-elevational view is the same.
Figure 6:
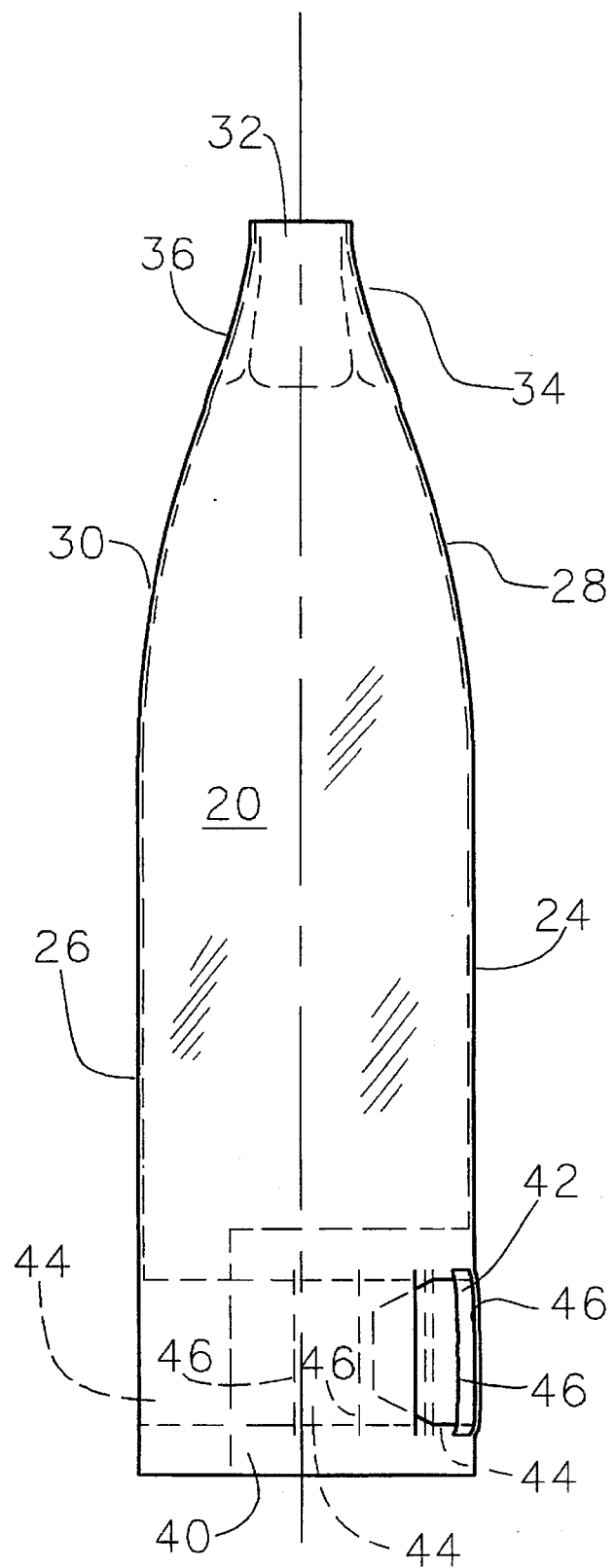
FIG. 6 is a bottom plan view of the guide.

FIGS. 3, 5 and 6 illustrate the interleaving and positioning of the flap 44 in the separations 46 in the flap 42. Since the width of the flap 44 is less than the length of the separations 46, it is possible to interleave the flap 44 between the separations 46 and the flap 42. This makes it possible to adjust the opening of the guide 20 for positioning on the electro-mechanical device.

In FIG. 3, and in view of that end which is positioned on the electro-mechanical device, it is that the flap 44 is interleaved and positioned in the serrations in the flap 42.

Figure 4:
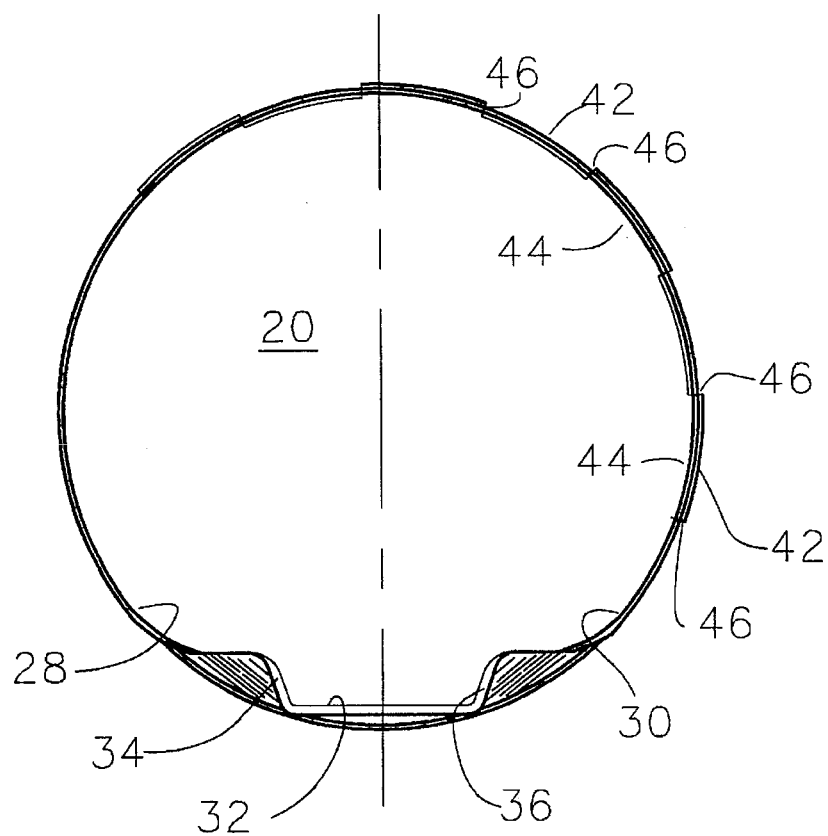
FIG. 4 is an outside end elevational view of the guide and which outside end is away from the electro-mechanical device.

FIG. 4 is an end view of that end of the guide and which end directs the flow of seeds. There is clearly illustrated the funnel end 32 with a left side 34 and a right side 36, a left taper 28 and a right taper 30. Again, there is illustrated the interleaving of a right flap 44 and the separations 46 in the left flap 42.

Figure 7:
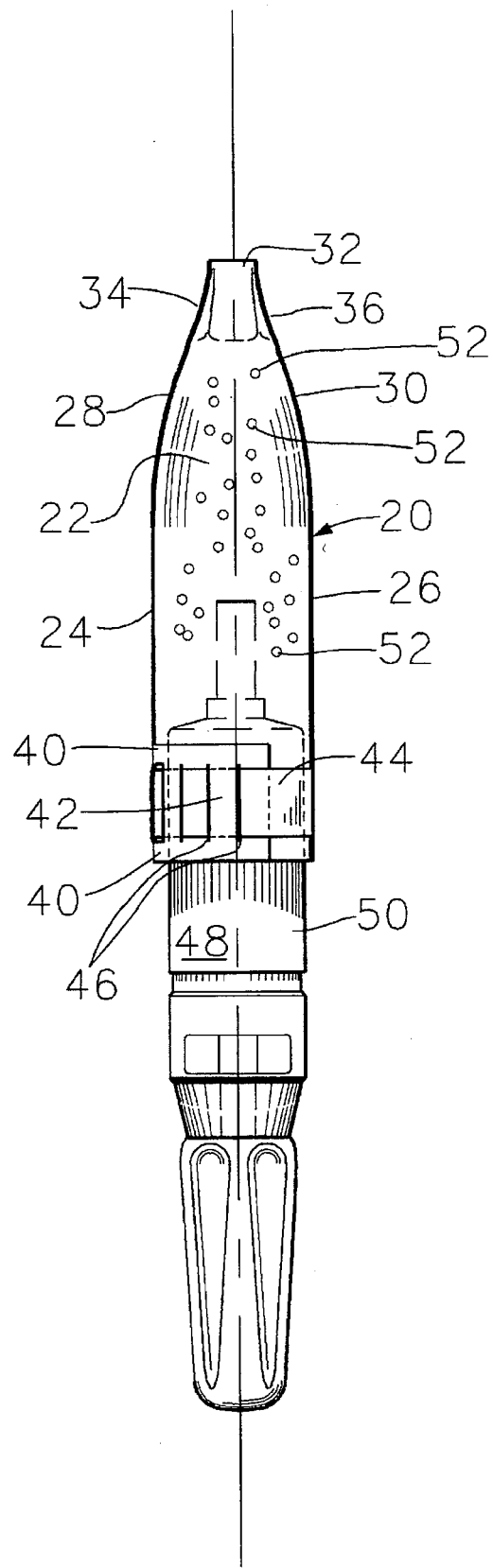
FIG. 7 is a top plan view of the guide attached to a typical electro-mechanical device such as a battery-operated screw driver.

In FIG. 7 it is seen that there is an electro-mechanical device 48 having a round member 50 or round housing which can receive the inner end of the guide 20. The inner end of the guide 20 can slip over the round member 50 and then be adjusted to snugly fit on round member 50.

In FIG. 7 the guide 20 is placed on the electro-mechanical device 48, i.e., a battery-operated screw driver.

In the drawings, see FIG. 7, it is seen that seeds 52 are placed in the elongated base 22. The person holding the electro-mechanical device 48 can turn on the device 48 so that the device 48 vibrates. Then, the person can adjust the angle of the elongated base 22 with respect to the ground. The seeds 52 will flow down the elongated base 22 and out of the guide 20 and through the outer funnel end 32.

The person holding the combination of the electro-mechanical device 48 and the guide 20 can control the rate of the flow of seeds from the guide 20 and onto the garden by the angle that the electro-mechanical device 48 and the guide 20 are positioned with respect to the ground.

With a greater angle of inclination, the seeds will flow faster from the guide 20.

The guide 20 can be made of a plastic. The plastic should be flexible so that it can be curved over onto itself and overlap itself for adjusting to the configuration of the electro-mechanical device.

A suitable plastic is identified as PETG and having a thickness of 0.030 inches.

The plastic can be a clear plastic. Clear plastic has an advantage as it is possible to readily see the seeds on the guide 20.

With the use of a thermoplastic, the guide 20 can be formed into the elevated left side 24; elevated right side 26; elevated left taper 28; elevated right taper 30; and, the outer funnel end 32.

Figure 8:
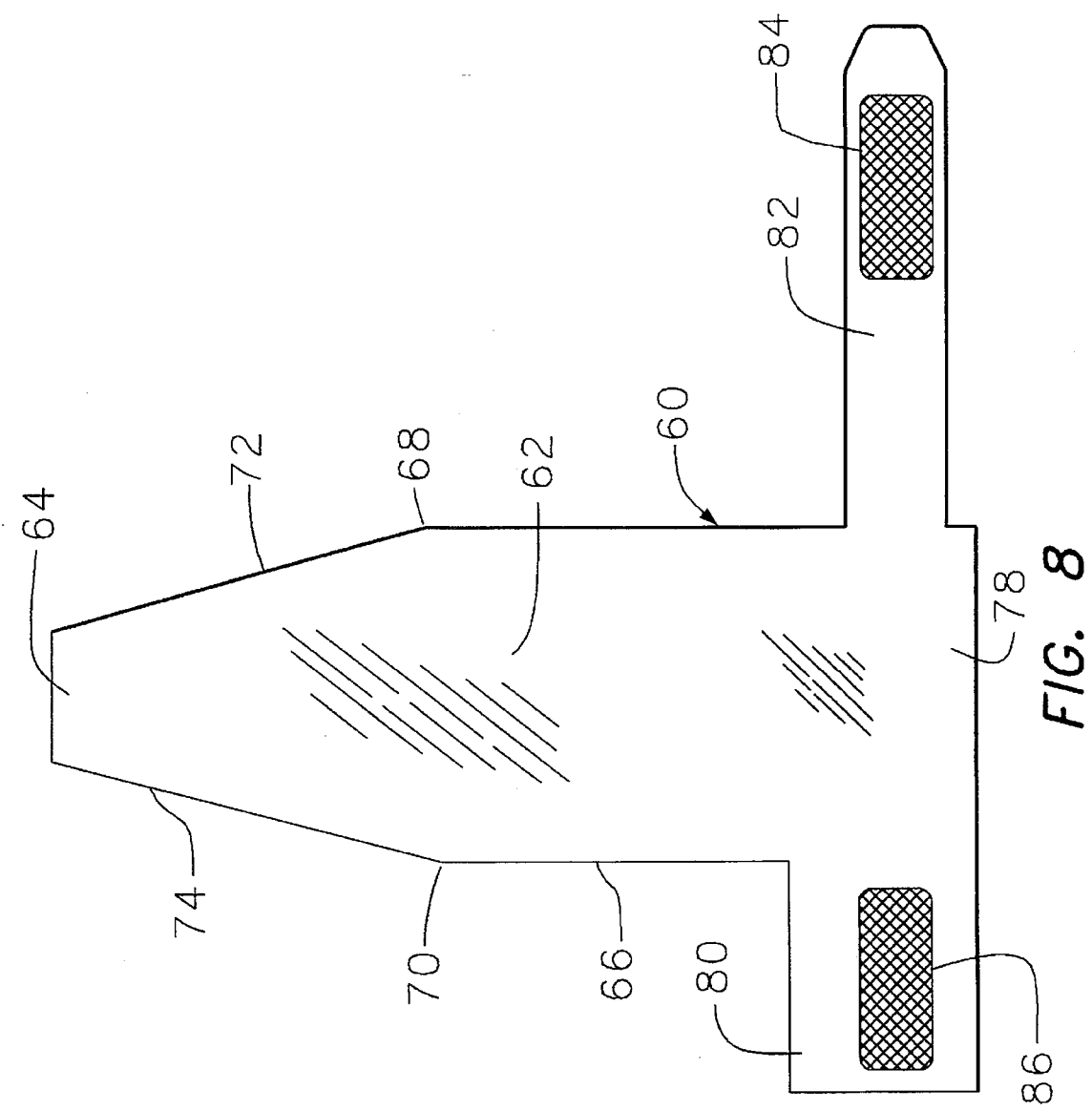
FIG. 8 is a top plan view of a second species of a guide in a stretched-out or expanded configuration.

FIGS. 8, 9 and 10 are directed to a second species of the invention and comprise a second guide 60.

The guide 60 has an elongated base 62 which is in a funnel end 64.

There is a left side 66 and a right side 68. The left side 66 extends into a left taper 70. The right side 68 extends into a right taper 72.

The left taper extends into an elevated side 74. The right taper 72 extends into an elevated side 76.

The elongated base 62, and the elevated sides 74 and 76 define the funnel end 64.

At the end of the guide 60 opposite to the funnel end 64, there is an inner central part 78 which extends into a left flap 80 and a right flap 82. On the outside surface of the right flap 82, there is a first bonding means 84.

On the inside of the left flap 80, there is a second bonding means 86.

The first bonding means 84 and the second bonding means 86 may be pushed together to form a secure bond between the left flap 80 and the right flap 82.

An example of the bonding means 84 and 86 is that one of the means may have loops and the other one of the means may have hooks. Upon pressing together the bonding means 84 and 86, the hooks get caught in the loops to form a secure bond between 84 and 86.

With respect to FIG. 7 and the electro-mechanical device 48, also known as a battery-operated screw driver, it is seen that the inner central part and the two flaps 80 and 82 can be wrapped around the housing 48. The degree of tightness desired for positioning the guides 60 on 48 can be determined and then the left flap 80 pressed against the right flap 82 so that the bonding means 84 and 86 securely position the guide 60 on the housing 50 of the device 48.

The advantage of the guide 60 is that there are numerous electro-mechanical devices 48 on the market and available to the purchasing public. It is the understanding of the applicant that there are nine such devices on the market and available to the public. The diameter and outside dimensions of the housing 50 vary. With the guide 60 it is possible to have one guide capable of co-fitting with all of these commercial devices.

After a person has used the guide 60 and desires to use the device 48, the person can pull on the extension of the left flap 80 so as to pull the bonding means 86 away from the bonding means 84. This makes it is possible to remove the guide 60 from the device 48.

FIG. 8 is a top plan view of the funnel 60 in a stretched-out or flat position. There is the inner central part 78 which blends into a right flap 82 and a left flap 80. On the right flap 82 there is a first bonding means 84. On the left flap 80 there is a second bonding means 86. With the bonding means 84 and 86 on the flaps 82 and 80 it is possible to have an adjustable opening for positioning the guide 60 on the electro-mechanical device. As a result, it is possible to have one guide 60 suitable for use with various electro-mechanical devices of different housing sizes and diameters.

FIG. 9 is an end view of that end of the guide 60 which is positioned on the electro-mechanical device. FIG. 9 shows meshing of the first bonding means 84 and the second bonding means 86 to securely position the guide 60 on the electro-mechanical device.

Figure 11:
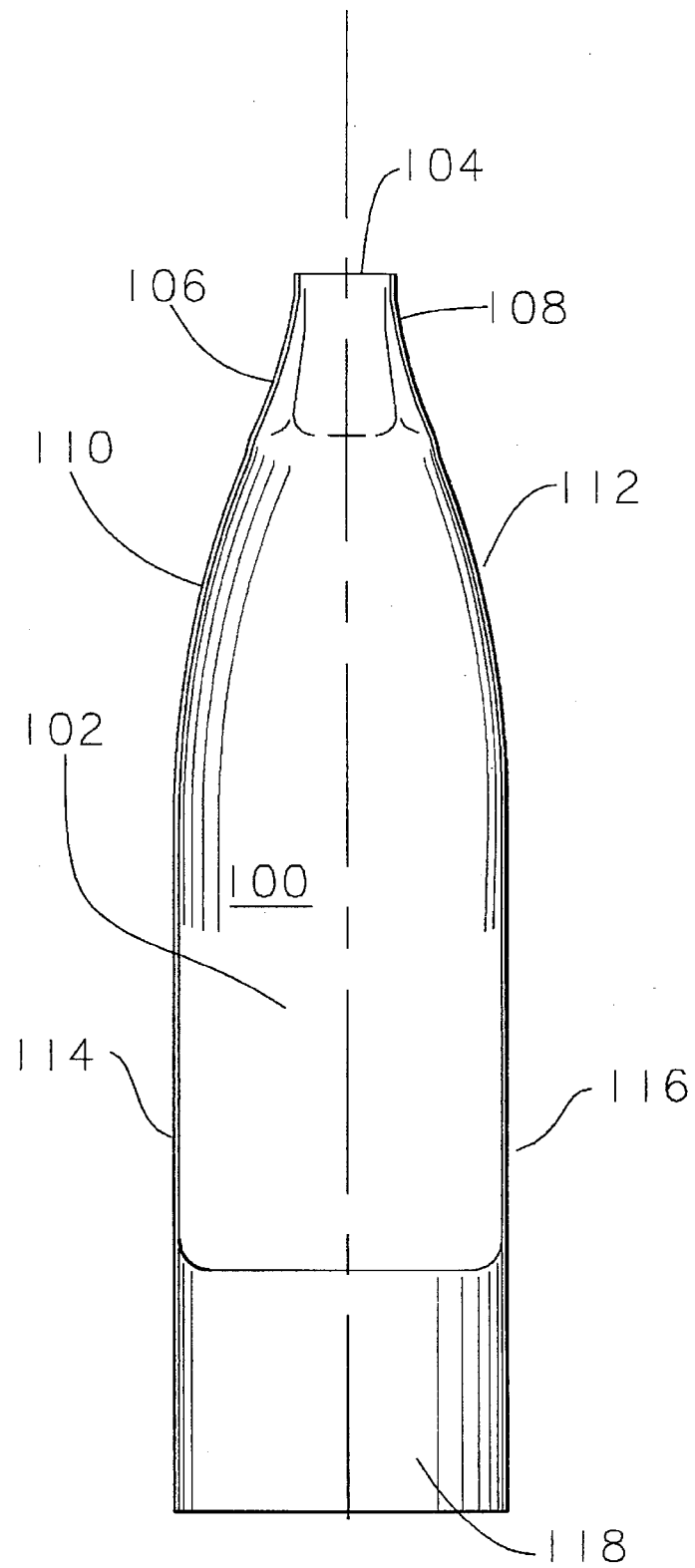
FIG. 11 is a top plan view of a third guide or third species and which guide is a non-adjustable guide designed to be positioned onto an electro-mechanical device.
Figure 12:
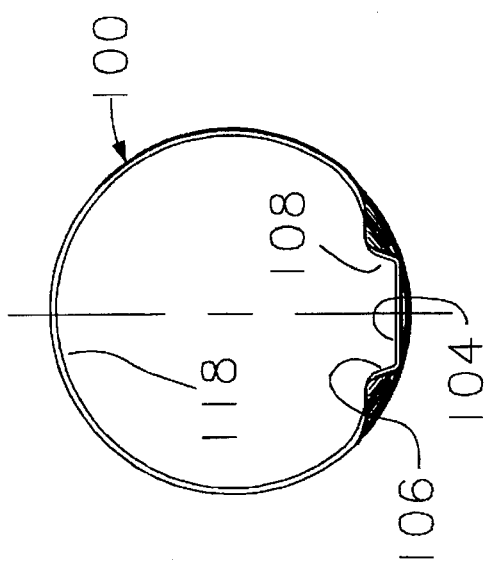
FIG. 12 is an outside end elevational view of the third guide and which guide outside end is away from the electro-mechanical device.
Figure 13:
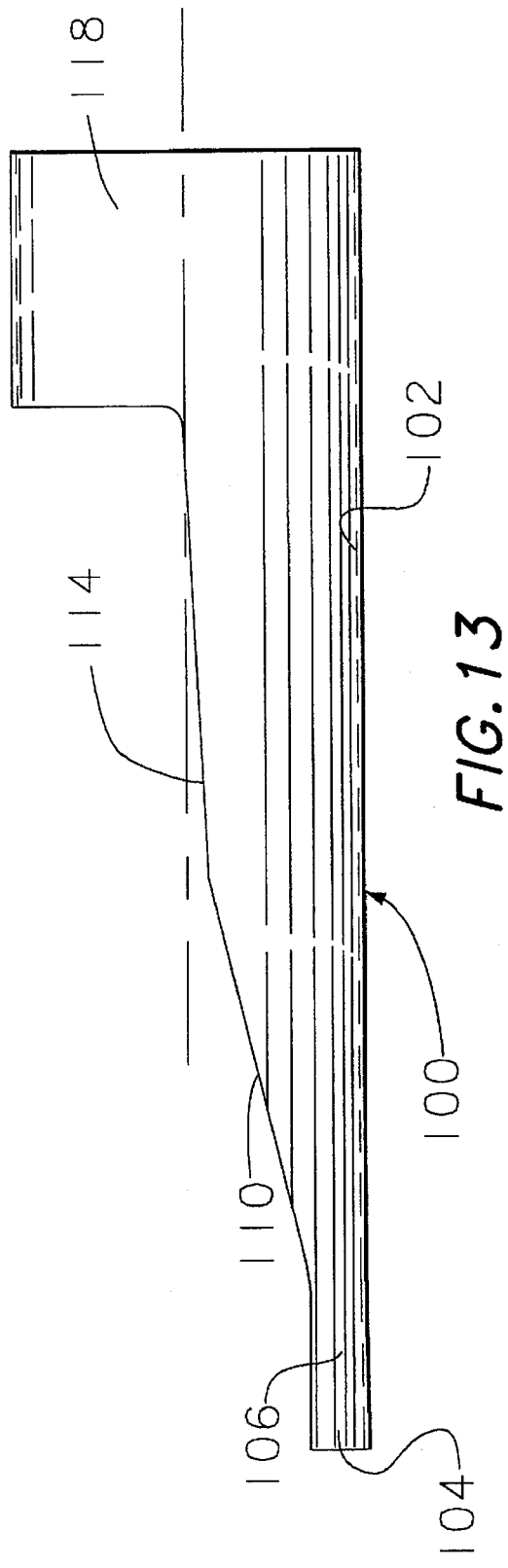
FIG. 13 is a side-elevational view of the guide of FIG. 11.

In FIGS. 11, 12 and 13 there is illustrated a guide 100 having an elongated base 102.

The guide 100 has a funnel end 104.

There is a left elevated side 106 and a right elevated side 108 assisting in defining the funnel end 104. There is a left taper 110 connecting with the left elevated side 106. There a is right taper 112 connecting with the right elevated side 108.

There is a left side 114 connecting with the left taper 110.

There is a right side 116 connecting with the right taper 112.

At that end of the guide 100 opposite to the funnel end 104 there is a circular end 118.

The guide 100 is a unitary one piece guide.

The opening at the circular end 118, see FIG. 12, is a fixed opening and is not adjustable. Therefore, for each electro-mechanical device 48 which is commercially available there must be a separate guide 100. The internal diameter of the circular end 108 is approximately the same dimension as the external diameter of the barrel 50 or housing 50 of the device 48. The guide 100 can be forced onto or positioned on the barrel 50 of the device 48. The fit is a snug fit and 48 will be definitely positioned on the barrel 50. After using the guide 50 the guide can be slipped off of the barrel 50 of the device 48.

Figure 14:
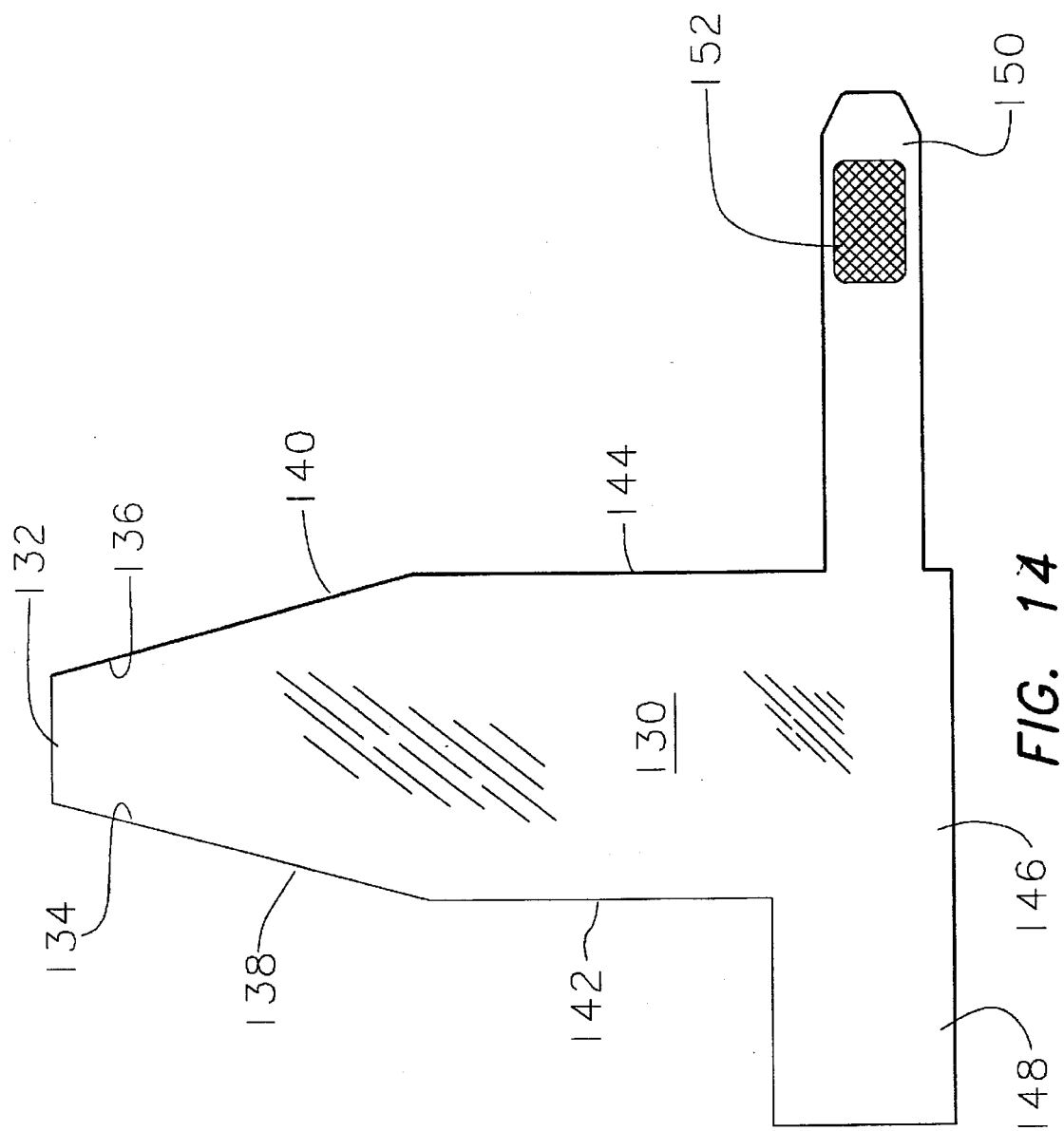
FIG. 14 is a top plan view of a fourth guide or a fourth species utilizing a strip of adhesive material for adjusting the opening of an inside end.

In FIG. 14, a top plan view of the guide 130, it is seen that the funnel end extends into a left side 134 and a right side 136.

The left side 134 extends into a left taper 138. The right side 136 extends into a right taper 140. The left taper 138 extends into a left side 142. The right taper 140 extends into a right side 144.

That end of the guide 130 opposite to the funnel end 132 there is an inner central part 146.

The part 146 extends into a left flap 142 and a right flap 144.

This makes it possible to adjust the opening of the guide 130 defined by 146, 148 and 150 to fit a large number of electro-mechanical devices 48. A person can overlap the left flap 148 and the right flap 150.

On the right flap 150 there is positioned an adhesive strip 152 or bonding strip 150.

The guide 130 can be positioned on the electro-mechanical device. For example, the inner central part 146 can be positioned around the barrel 50 or the housing 50. Then, the left flap 148 can be moved over the housing 50. Likewise, the right flap 150 can be moved over the housing 50. In other words, the left flap 148 and right flap 150 are wrapped around the housing 50.

Then, the inner surface of the right flap 150 can be pressed against the outer surface of the left flap 158 so that the adhesive strip 152 adheres to the left flap 148. This securely positions the guide 130 on the electro-mechanical device and, especially, on the housing 50.

It can be seen that the guide 130 can be configured to fit with many electro-mechanical devices having various sized outer dimensions for the housing 50. This is possible because of the left flap 148, the right flap 150 and the adhesive 152.

The bonding strip has a base material 154 and on one surface an adhesive 156. The adhesive contacts the outer surface of the right flap 150 and the outer surface of the left flap 148.

In the foregoing it is seen that the inventor has provided a plurality of guides for fitting onto electro-mechanical device 48 for distributing seeds in a garden.

Three of these guides, 20, 60, and 130, have adjustable openings for co-fitting with a number of the devices 48.

One of the guides, 100, has a fixed opening for co-fitting with a device 48. Therefore, there must be a plurality of guides 100 for co-fitting with all of the various devices 48.

With the other guides 20, 60, and 130 only one size need be manufactured for co-fitting with all the devices 48.

A guide for directing the flow of material and comprising a funnel end; an inner central part; a base; said funnel end, said inner central part and said base being continuous; said base extending a wall on each side to define a first elevated side and a second elevated side; said inner central part defining an opening; said first elevated side wall tapering into a first taper; said first taper extends into a first elevated end; said second elevated side wall tapering into a second taper; said second taper extends into a second elevated end; the distance between said first elevated and said second elevated end being less than the distance between said first elevated side and said second elevated side to assist in defining said funnel end; and said guide being unitary and one continuous piece.

A guide for directing the flow of material and comprising a funnel end; an inner central part; a base; said funnel end, said inner central part and said base being continuous; said base extending a wall on each side to define a first elevated side and a second elevated side; said inner central part defining an opening; said inner central part extending into a first flap; said first flap being of such length as to overlay said inner central part to define said opening; and, said first flap being flexible and pliable.

A guide for directing the flow of material and comprising a funnel and; an inner central part; a base; said funnel end, said inner central part and said base being continuous; said base extending a wall on each side to define a first elevated side and a second elevated side; said inner central part defining an opening; said inner central part extending into a first flap and into a second flap; said first flap and said second flap being flexible and pliable; said first flap having a plurality of cuts; and, said second flap being of a width less than the length of the cut so that the second flap can be positioned in the cut for interleaving the first flap and the second flap for adjusting the size and the configuration of said opening.

A guide for directing the flow of material and comprising a funnel end; an inner central part; a base; said funnel end, said inner central part and said base being continuous; said base extending a wall on each side to define a first elevated side and a second elevated side; said inner central part defining an opening; said inner central part extending into a first flap and into a second flap; said first flap and said second flap being flexible and pliable; said first flap and said second flap being of sufficient lengths to overlap each other; on said first flap there is a first bonding means; on said second flap there is a second bonding means; and, said first bonding means and said second bonding coact to bond together the first flap and the second flap for adjusting the size and the configuration of said opening.

A guide for directing the flow of material and comprising a funnel end; an inner central part; a base; said funnel end, said inner central part and said base being continuous; said base extending a wall on each side to define a first elevated side and a second elevated side; said inner central part defining an opening; said inner central part extending into a first flap and into a second flap; said first flap and said second flap being flexible and pliable; said first flap and said second flap being of sufficient lengths to overlap each other; with said first flap and said second flap overlying each other and an adhesive means simultaneously contacting said first flap and said second flap for adjusting the size and the configuration of said opening.

A combination of an electro-mechanical device and a guide; said electro-mechanical device comprising a housing; and electric motor; batteries; with said electric motor operating said device vibrates; said guide comprising a funnel end; an inner central part; a base; said funnel end, said inner central part and said base being continuous; said base extending a wall on each side to define a first elevated side and a second elevated side; and, said inner central part defining an opening for overlying said housing and for positioning said guide on said device.

A combination of an electro-mechanical device and a guide; said electro-mechanical device comprising a housing; and electric motor; batteries; with said electric motor operating said device vibrates; said guide comprising a funnel end; an inner central part; a base; said funnel end, said inner central part and said base being continuous; said base extending a wall on each side to define a first elevated side and a second elevated side; said inner central part defining an opening for overlying said housing and for positioning said guide on said device; and, said guide being unitary and one continuous piece.

A combination of an electro-mechanical device and a guide; said electro-mechanical device comprising a housing; and electric motor; batteries; with said electric motor operating said device vibrates; said guide comprising a funnel end; an inner central part; a base; said funnel end, said inner central part and said base being continuous; said base extending a wall on each side to define a first elevated side and a second elevated side; said inner central part defining an opening for overlying said housing and for positioning said guide on said device; said inner central part extending into a first flap; said first flap being of such length as to overlay said inner central part to define said opening; and, said first flap being flexible and pliable.

A combination of an electro-mechanical device and a guide; said electro-mechanical device comprising a housing; and electric motor; batteries; with said electric motor operating said device vibrates; said guide comprising a funnel end; an inner central part; a base; said funnel end, said inner central part and said base being continuous; said base extending a wall on each side to define a first elevated side and a second elevated side; said inner central part defining an opening for overlying said housing and for positioning said guide on said device; said inner central part extending into a first flap and into a second flap; said first flap and said second flap being flexible and pliable; said first flap having a plurality of cuts; and, said second flap being of a width less than the length of the cut so that the second flap can be positioned in the cut for interleaving the first flap and the second flap for adjusting the size and the configuration of said opening.

A combination of an electro-mechanical device and a guide; said electro-mechanical device comprising a housing; and electric motor; batteries; with said electric motor operating said device vibrates; said guide comprising a funnel end; an inner central part; a base; said funnel end, said inner central part and said base being continuous; said base extending a wall on each side to define a first elevated side and a second elevated side; said inner central part defining an opening for overlying said housing and for positioning said guide on said device; said inner central part extending into a first flap and into a second flap; said first flap and said second flap being flexible and pliable; said first flap and said second flap being of sufficient lengths to overlap each other; on said first flap there is a first bonding means; on said second flap there is a second bonding means; and, said first bonding means and said second bonding coact to bond together the first flap and the second flap for adjusting the size and the configuration of said opening.

A combination of an electro-mechanical device and a guide; said electro-mechanical device comprising a housing; and electric motor; batteries; with said electric motor operating said device vibrates; said guide comprising a funnel end; an inner central part; a base; said funnel end, said inner central part and said base being continuous; said base extending a wall on each side to define a first elevated side and a second elevated side; said inner central part defining an opening for overlying said housing and for positioning said guide on said device; said inner central part extending into a first flap and into a second flap; said first flap and said second flap being flexible and pliable; said first flap and said second flap being of sufficient lengths to overlap each other; with said first flap and said second flap overlying each other and an adhesive means simultaneously contacting said first flap and said second flap for adjusting the size and the configuration of said opening.

A process for making a guide for directing the flow of material and comprising forming said guide to have a funnel end, an inner central part and a base with said funnel end, inner control part and said base being continuous; extending said base into a wall on each side to define a first elevated side and a second elevated side; forming said inner central part to define an opening; and, forming said guide to be unitary and one continuous piece.

A process for making a guide for directing the flow of material and comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap; forming said first flap to be of such a length as to overlay said inner central part thereby defining said opening; and, forming said first flap to be flexible and pliable.

A process for making a guide for directing the flow of material and comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap and into a second flap; forming said first flap and said second flap to be flexible and pliable; forming a plurality of cuts in said first flap; and, forming said second flap to be of a width less than the length of said cut for positioning said second flap in said cut for interleaving the first flap and the second flap for adjusting the size and the configuration of said opening.

A process for making a guide for directing the flow of material and comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap and into a second flap; forming said first flap and said second flap to be flexible and pliable; forming said first flap and said second flap of sufficient lengths to overlap each other; positioning a first bonding means on said first flap; positioning a second bonding means on said second flap; and, employing said first bonding means and said second bonding means to bond together the first flap and the second flap for adjusting the size and the configuration of said opening.

A process for making a guide for directing the flow of material and comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap and into a second flap; forming said first flap and said second flap to be flexible and pliable; forming a plurality of cuts in said first flap; and, overlying said first flap and said second flap and applying an adhesive means for simultaneously contacting said first flap and said second flap for adjusting the size and the configuration of said opening.

A process for making a combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; and, forming said guide to be unitary and one continuous piece.

A process for making a combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap; forming said first flap to be of such a length as to overlay said inner central part thereby defining said opening; and, forming said first flap to be flexible and pliable.

A process for making a combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap and into a second flap; forming said first flap and said second flap to be flexible and pliable; forming a plurality of cuts in said first flap; and, forming said second flap to be of a width less than the length of said cut for positioning said second flap in said cut for interleaving the first flap and the second flap for adjusting the size and the configuration of said opening.

A process for making a combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap and into a second flap; forming said first flap and said second flap to be flexible and pliable; forming said first flap and said second flap of sufficient lengths to overlap each other; positioning a first bonding means on said first flap; positioning a second bonding means on said second flap; and, employing said first bonding means and said second bonding means to bond together the first flap and the second flap for adjusting the size and the configuration of said opening.

A process for making a combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap and into a second flap; forming said first flap and said second flap to be flexible and pliable; forming a plurality of cuts in said first flap; and, overlying said first flap and said second flap and applying an adhesive means for simultaneously contacting said first flap and said second flap for adjusting the size and the configuration of said opening.

A guide for directing the flow of material and made by a process comprising forming said guide to have a funnel end, an inner central part and a base with said funnel end, inner control part and said base being continuous; extending said base into a wall on each side to define a first elevated side and a second elevated side; forming said inner central part to define an opening; and, forming said guide to be unitary and one continuous piece.

A guide for directing the flow of material and made by a process comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap; forming said first flap to be of such a length as to overlay said inner central part thereby defining said opening; and, forming said first flap to be flexible and pliable.

A guide for directing the flow of material and made by a process comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap and into a second flap; forming said first flap and aid second flap to be flexible and pliable; forming a plurality of cuts in said first flap; and, forming said second flap to be of a width less than the length of said cut for positioning said second flap in said cut for interleaving the first flap and the second flap for adjusting the size and the configuration of said opening.

A guide for directing the flow of material and made by a process comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap and into a second flap; forming said first flap and said second flap to be flexible and pliable; forming said first flap and said second flap of sufficient lengths to overlap each other; positioning a first bonding means on said first flap; positioning a second bonding means on said second flap; and, employing said first bonding means and said second bonding means to bond together the first flap and the second flap for adjusting the size and the configuration of said opening.

A guide for directing the flow of material and made by a process comprising forming said guide to have a funnel end, an inner central part and a base with said funnel end, inner control part and said base being continuous; extending said base into a wall on each side to define a first elevated side and a second elevated side; forming said inner central part to define an opening; extending said inner central part into a first flap and into a second flap; forming said first flap and said second flap to be flexible and pliable; forming a plurality of cuts in said first flap; and, overlying said first flap and said second flap and applying an adhesive means for simultaneously contacting said first flap and said second flap for adjusting the size and the configuration of said opening.

A combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; and, forming said guide to be unitary and one continuous piece.

A combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap; forming said first flap to be of such a length as to overlay said inner central part thereby defining said opening; and, forming said first flap to be flexible and pliable.

A combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap and into a second flap; forming said first flap and said second flap to be flexible and pliable; forming a plurality of cuts in said first flap; and, forming said second flap to be of a width less than the length of said cut for positioning said second flap in said cut for interleaving the first flap and the second flap for adjusting the size and the configuration of said opening.

A combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap and into a second flap; forming said first flap and said second flap to be flexible and pliable; forming said first flap and said second flap of sufficient lengths to overlap each other; positioning a first bonding means on said first flap; positioning a second bonding means on said second flap; and, employing said first bonding means and said second bonding means to bond together the first flap and the second flap for adjusting the size and the configuration of said opening.

A combination of an electro-mechanical device and a guide, said process comprising forming a housing for said electro-mechanical device; positioning an electric motor and batteries in said housing; contacting said batteries and said electric motor to run said electric motor; forming said guide to have a funnel end, an inner central part and a base with said funnel end, inner control part and said base being continuous; extending said base into a wall on each side to define a first elevated side and a second elevated side; forming said inner central part to define an opening for overlying said housing and for positioning said guide on said device; extending said inner central part into a first flap and into a second flap; forming said first flap and said second flap to be flexible and pliable; forming a plurality of cuts in said first flap; and, overlying said first flap and said second flap and applying an adhesive means for simultaneously contacting said first flap and said second flap for adjusting the size and the configuration of said opening.

What I claimed is:

1. A guide for directing the flow of a material and comprising:
   a. a base having a first end and a second end;
   b. said base on its first end having a funnel end;
   c. said base on its second end having an inner central part;
   d. said funnel end, said inner central part and said base being continuous;
   e. said base having an upper surface for receiving said material and a lower surface;
   f. said base extends into a first side from said upper surface and said first side being at an angle to said base and to said upper surface, and said first side being identified as a first elevated side wall;
   g. said base extends into a second side from said upper surface and said second side being at an angle to said base and to said upper surface, and said second side being identified as a second elevated side wall;
   h. said first side wall and said second side wall are spaced apart and are elevated with respect to the base to form said guide for receiving said material on said upper surface; and
   i. said inner central part defining an opening for receiving and positioning in said opening a separate electro-mechanical device for vibrating said guide for directing the flow of said material.

2. A guide according to claim 1 and comprising:
   a. said first elevated side wall tapering into a first taper;
   b. said first taper extends into a first elevated end;
   c. said second elevated side wall tapering into a second taper;
   d. said second taper extends into a second elevated end; and,
   e. the distance between said first elevated end and said second elevated end being less than the distance between said first elevated side wall and said second elevated side wall to assist in defining said funnel end.

3. A guide according to claim 2 and comprising:
   a. said guide being unitary.

4. A guide according to claim 1 and comprising:
   a. said inner central part extending into a first flap;
   b. said first flap being of such length as to overlay said inner central part to define said opening;
   c. said first flap being flexible and pliable; and
   d. the upper surface of said base at said first end being elevated to function as a restrictor to the flow of said material.

5. A guide according to claim 1 and comprising:
   a. said inner central part on one side extending into a first flap and on another side extending into a second flap;
   b. said first flap and said second flap being flexible and pliable and being capable of overlapping each other;
   c. said first flap having a plurality of cuts; and
   d. said second flap being of a width less than the length of the cut so that the second flap can be positioned in the cut for interleaving the first flap and the second flap for adjusting the size and the configuration of said opening for receiving and positioning said separate electro-mechanical device.

6. A guide according to claim 1 and comprising:
   a. said inner central part on one side extending into a first flap and on another side extending into a second flap;
   b. said first flap and said second flap being flexible and pliable and being capable of overlapping each other;
   c. on said first flap there is a first bonding means;
   d. on said second flap there is a second bonding means; and
   e. said first bonding means and said second bonding means coact to bond together the first flap and the second flap for adjusting the size and the configuration of said opening for receiving and positioning said separate electro-mechanical device.

7. A guide according to claim 1 and comprising:
   a. said inner central part on one side extending into a first flap and on another side extending into a second flap;
   b. said first flap and said second flap being flexible and pliable and being capable of overlapping each other;

c. with said first flap and said second flap overlying each other an adhesive means simultaneously contacts said first flap and said second flap for adjusting the size and the configuration of said opening for receiving and positioning said separate electro-mechanical device.

8. A combination of an electro-mechanical device and a guide for directing the flow of a material;
said electro-mechanical device comprising:
a. a housing;
b. electric motor;
c. batteries;
d. wherein said electric motor and said batteries are located within said housing, and;
e. said electric motor and said batteries are operatively connected;
f. with said electric motor operating said device vibrates; said guide comprising:
a base having a first end and a second end;
said base on its first end having a funnel end;
g. said base on its second end having an inner central part;
h. said funnel end, said inner central part and said base being continuous;
i. said base having an upper surface for receiving said material and a lower surface;
j. said base extends into a first side from said upper surface and said first side being at an angle to said base and to said upper surface, and said first side being identified as a first elevated side wall;
k. said base extends into a second side from said upper surface and said second side being at an angle to said base and to said upper surface and said second side being identified as a second elevated side wall;
l. said first side wall and said second side wall are spaced apart and are elevated with respect to the base to form said guide for receiving said material on said upper surface; and
m. said inner central part defining an opening for receiving and for positioning in said opening said separate electro-mechanical device for vibrating said guide for directing the flow of said material.

9. A combination according to claim 8 and comprising:
a. said first elevated side wall tapering into a first taper;
b. said first taper extends into a first elevated end;
c. said second elevated side wall tapering into a second taper;
d. said second taper extends into a second elevated end; and,
e. the distance between said first elevated end and said second elevated end being less than the distance between said first elevated side wall and said second elevated side wall to assist in defining said funnel end.

10. A combination according to claim 9 and comprising:
a. said guide being unitary.

11. A combination according to claim 8 and comprising:
a. said inner central part extending into a first flap;
b. said first flap being of such length as to overlay said inner central part to define said opening;
c. said first flap being flexible and pliable; and
d. the upper surface of said base at said first end being elevated to function as a restrictor to the flow of said material.

12. A combination according to claim 8 and comprising:
a. said inner central part on one side extending into a first flap and on another side extending into a second flap;
b. said first flap and said second flap being flexible and pliable and being capable of overlapping each other;
c. said first flap having a plurality of cuts; and
d. said second flap being of a width less than the length of the cut so that the second flap can be positioned in the cut for interleaving the first flap and the second flap for adjusting the size and the configuration of said opening for receiving and positioning said separate electro-mechanical device.

13. A combination according to claim 8 and comprising:
a. said inner central part on one side extending into a first flap and on another side extending into a second flap;
b. said first flap and said second flap being flexible and pliable and being capable of overlapping each other;
c. on said first flap there is a first bonding means;
d. on said second flap there is a second bonding means; and
e. said first bonding means and said second bonding means coact to bond together the first flap and the second flap for adjusting the size and the configuration of said opening for receiving and positioning said separate electro-mechanical device.

14. A combination according to claim 8 and comprising:
a. said inner central part on one side extending into a first flap and on another side extending into a second flap;
b. said first flap and said second flap and being flexible and pliable and being capable of overlapping each other;
c. with said first flap and said second flap overlying each other an adhesive means simultaneously contacts said first flap and said second flap for adjusting the size and the configuration of said opening for receiving and positioning said separate electro-mechanical device.

* * * * *